INVENTOR.
ELLARSON R. STOUT
BY
William V. Ebs
HIS ATTORNEY

United States Patent Office 3,395,553
Patented Aug. 6, 1968

3,395,553
TORQUE LIMITING DRIVE COUPLING
Ellarson R. Stout, Fayson Lakes, N.J., assignor to Curtiss-Wright Corporation, a corporation of Delaware
Filed Apr. 7, 1966, Ser. No. 540,928
3 Claims. (Cl. 64—15)

ABSTRACT OF THE DISCLOSURE

A coupling is arranged to transmit torque up to a predetermined maximum value through a helical spring located between input and output members of the device, and to enable the output member to overrun the input member with only an end coil of the spring in rubbing contact with relatively rotating structure, as well as permit misalignment of the members.

---

Figure 1:
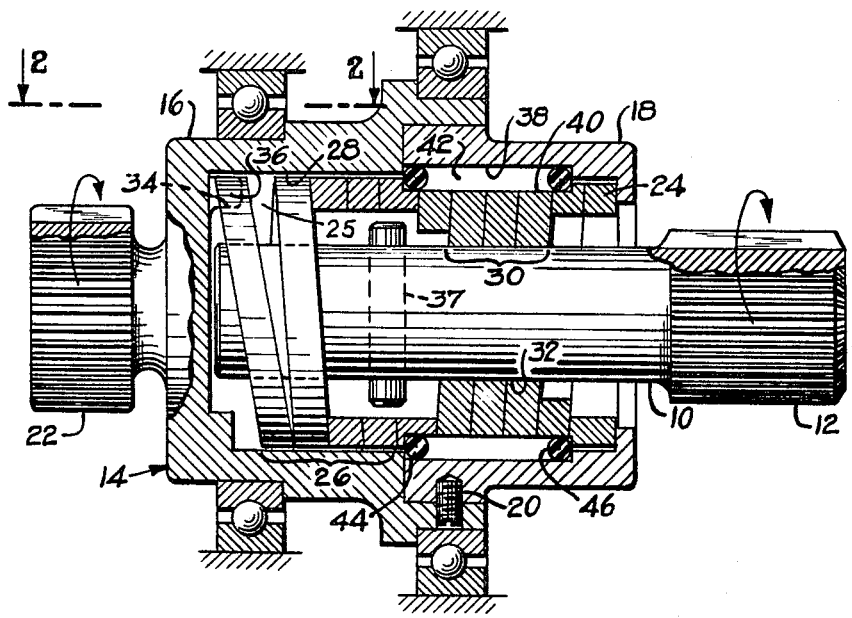

My invention relates to torque limiting drive couplings and, more particularly, to such couplings wherein torque is transmitted between input and output members through a coil spring.

It is a principal object of the invention to provide an improved spring clutch drive coupling through which torque may be transmitted in only one direction and only up to a predetermined value at which relative rotation of input and output members of the coupling occurs.

It is another object of the invention to provide such a spring clutch drive coupling wherein the output member of the coupling can overrun the input member and overrunning drag is a minimum.

It is still another object of the invention to provide an improved spring clutch drive coupling permitting misalignment of input and output members of the device.

Other objects and advantages of the invention will become apparent hereinafter.

The drive coupling of the invention includes a rotatable input member, a rotatable output member and a coil spring having certain coils preloaded against a cylindrical surface on one of the members. Other coils of the spring are actuable into tight-fitting engagement with a cylindrical surface on the other member upon rotation of the input member in a direction opposite to the hand of the spring as viewed from the input end of the clutch, and the input member is thereby drivably connected to the output member through the spring. If load on the output shaft becomes excessive, the member in contact with the preloaded coils slips under the spring to interrupt the driving connection. The preloaded coils are free to flex and permit axial misalignment of the input and output members. The coupling is adapted for relative axial movement of the spring and spring actuating means to enable the output member to overrun the input member and overrunning drag is maintained at a minimum.

Figure 2:
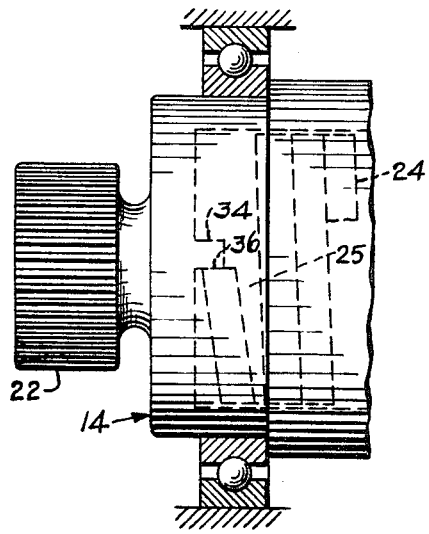

Referring to the drawing wherein the coupling of the invention is shown in detail:

FIG. 1 is a vertical longitudinal sectional view of the coupling of the invention; and FIG. 2 is a fragmentary plan view of the coupling of FIG. 1.

In the drawings, reference character 10 designates an input member provided with splines 12 for connecting said member to a drive shaft. The input member 10 extends within an output member 14 consisting of parts 16 and 18 held in an assembled relationship by set screw 20. As shown, part 16 is integral with an output gear 22.

A helical spring 24 located between the input and output members includes certain coils 26 which are formed so as to cause them to assume a position when in a relaxed condition, either just barely out of contact with inner cylindrical surface 28 of part 16 as shown in FIG. 1, or else just barely touching the cylindrical surface 28 and not exerting any appreciable radially outward force against such cylindrical surface. Other coils 30 of greater thickness than the coils 26 are preloaded against cylindrical surface 32 on the member 10. An abutment 34 provided on output member 14 is engageable by the free end of the coils 26, that is, at 36. A pin 37 through the member 10 prevents axial separation of the input on output members.

The spring 24 may be right-handed as shown in FIG. 1 to provide for the transmission of torque from input to output member upon rotation of the input member in the direction indicated, or the spring may be left-handed to provide for the transmission of torque upon rotation of the input member in the opposite direction.

Assuming the output member 14 is connected to a load, the clutch is energized upon rotation of the input member as viewed from the input end of the clutch in the same direction as the hand of the spring. The spring 24 is caused to act against the abutment 34, and the coils 26 are actuated into enforced contact with inner cylindrical surface 28 whereupon the input member drives the output member through the spring. If the load on the output shaft should become excessive, the input member 10 slips under the preload coils 30 of the spring to interrupt the transmission of power between input and output members and so prevent damage to the clutch and connected torque transmitting parts. The maximum torque which can be transmitted between the input and output member is predetermined for any particular selected materials for the spring 24 and member 10 by the preload forces exerted by the spring against the member 10. The spring 24 is manufactured with a diameter for the coils 30 which is less than that of the member 10 to the extent required to provide the desired amount of preload of said coils 30 on the member 10 in the assembled clutch.

End coils of the spring 24 within output member 14 are separated, as shown for example at 25, and can flex axially. The output member 14 is therefore capable of overrunning the input member. The abutment 34 merely rides over the end coil if the output member 14 rotates at a greater speed and in the same direction as input member 10, and the separated end coils within the output member axially contract to accommodate the abutment. The coils 26 assume their radially relaxed positions when the output member 14 overruns the input member 10. Overrunning drag is therefore very slight, being determined almost solely by the axial deflection force of the separated coils of the springs and the coefficient of friction for the contacting abutment 34 and spring.

As shown, part 18 is recessed at 38 in the region of the coils 30 and the spring is undercut at 40 opposite the recess to provide an annular space 42 between the spring and part 18 wherein rings 44 and 46 of elastomeric material are provided to axially position the spring with respect to the output member 14. The annular space 42 imparts flexibility to the coupling since it permits coils of the spring opposite the space to be deflected by relative angular movement of the input and output members. Also, the inner surfaces of the spring coils extending within the output member 14 are radially spaced substantial distances from the input member 10 and pin 37 as shown to allow such movement and misalignment of the said members.

While member 10 has been referred to as an input member and member 14 has been referred to as an output member, it will, of course, be understood that either member may be the driving or driven member.

In either case, power is transmitted upon rotation of the driving member in a direction corresponding to the hand of the spring 24 as viewed from the driving end of the clutch. Also, although only one embodiment of the invention has been shown, it will be understood by those skilled in the art that other embodiments are possible and that various changes and modifications may be made within the scope of the claims without departing from the spirit and scope of the invention. In particular, it will be appreciated, for example, that the spring in the clutch of the invention might have coils preloaded against member 14 instead of the member 10 and other coils actuable into tightly enforced contact with the member 10 by actuating means on the member 10 upon rotation of the member 10 or member 14 in a direction opposite to the hand of the spring as viewed from the driving end of the clutch.

I claim:

1. A torque limiting coupling comprising a pair of rotatable members, one member having an inside cylindrical surface and the other having an outer cylindrical surface; a helical spring having one group of coils preloaded against one of the said cylindrical surfaces and another group of coils to coact with the other cylindrical surface; and means on said other cylindrical surface to engage the end of said another group of coils upon rotation of the member engaged by the preload coils in one direction and enforce tight-fitting engagement of said another group of coils with said other cylindrical surface and thereby drivably connect the said members through the spring to transmit torque up to a maximum value at which slippage occurs between the preload coils and member engaged thereby; the coupling being adapted for relative axial displacement of the engageable end of the said another group of coils and the spring end engaging means upon rotation of the member including said other cylindrical surface relative to the spring in the said one direction.

2. A torque limiting coupling comprising one member with an inner cylindrical surface; another member extending within the one member and having an outer cylindrical surface; a helical spring having one group of coils preloaded against one of said cylindrical surfaces and another group of coils to coact with the other cylindrical surface, said one group of coils being greater in thickness than said other group, the said other group of coils being radially spaced a substantial distance from the member engaged by the preload coils and the preload coils being radially spaced a substantial distance from the other member to enable relative angular movement of the rotatable members; and means on the said other cylindrical surface to engage the end of the said another group of coils upon rotation in one direction of the member engaged by the preload coils and enforce tight-fitting engagement of said another group of coils with said other cylindrical surface to thereby drivably connect the said members through the spring and transmit torque up to a maximum value at which slippage occurs between the preload coils and member engaged thereby.

3. A torque limiting coupling comprising one member with an inner cylindrical surface; another member extending within the one member and having an outer cylindrical surface; a helical spring between the members having one group of coils preloaded against one of said cylindrical surfaces and another group of coils to coact with the other cylindrical surface, said one group of coils being greater in thickness than said other group, the said other group of coils being radially spaced a substantial distance from the member engaged by the preload coils and the preload coils being radially spaced a substantial distance from the other member to enable relative angular movement of the rotatable members; means determining an axial position for the spring in the member with the inner cylindrical surface; means affixed to the member with the outer cylindrical surface and engageable with the said one group of coils for opposing axial separation of the members; and means on the said other cylindrical surface to engage the end of the said another group of coils upon rotation of the member engaged by the preload coils in one direction and enforce tight-fitting engagement of said another group of coils with said other cylindrical surface and thereby drivably connect the members through the spring to transmit torque up to a maximum value at which slippage occurs between the preload coils and member engaged thereby.

References Cited

UNITED STATES PATENTS

| | | | |
|---|---|---|---|
| 1,126,780 | 2/1915 | Jones. | |
| 1,934,790 | 11/1933 | Brownlee | 192—41 |
| 2,043,695 | 6/1936 | Brownlee | 192—41 |
| 2,548,747 | 4/1951 | Sarkey | 64—30 X |
| 2,595,454 | 5/1952 | Greenlee | 64—30 |
| 2,984,325 | 5/1961 | Tomko et al. | 192—81 |
| 3,111,822 | 11/1963 | Hanson | 64—27 X |
| 3,301,364 | 1/1967 | Bennett et al. | 64—30 |

HALL C. COE, *Primary Examiner.*